US012208423B2

(12) United States Patent
Memon et al.

(10) Patent No.: US 12,208,423 B2

(45) Date of Patent: Jan. 28, 2025

(54) SYSTEM AND METHOD FOR AUTOMATICALLY SORTING ITEMS IN A PLURALITY OF BINS USING ROBOTS

(71) Applicant: UNBOXROBOTICS LABS PRIVATE LIMITED, Bangalore (IN)

(72) Inventors: Mohammadshahid Abdulshakur Memon, Kutch (IN); Pramod Vasant Ghadge, Mumbai (IN)

(73) Assignee: UNBOXROBOTICS LABS PRIVATE LIMITED, Bangalore (IN)

(*) Notice: Subject to any disclaimer, the term of this patent is extended or adjusted under 35 U.S.C. 154(b) by 106 days.

(21) Appl. No.: 17/423,096

(22) PCT Filed: Apr. 12, 2020

(86) PCT No.: PCT/IN2020/050347

§ 371 (c)(1),
(2) Date: Jul. 14, 2021

(87) PCT Pub. No.: WO2020/208658

PCT Pub. Date: Oct. 15, 2020

(65) Prior Publication Data

US 2022/0288645 A1 Sep. 15, 2022

(30) Foreign Application Priority Data

Apr. 12, 2019 (IN) ............................. 201921014909

(51) Int. Cl.
*B07C 5/36* (2006.01)

(52) U.S. Cl.
CPC ...... *B07C 5/361* (2013.01); *B07C 2501/0063* (2013.01)

(58) Field of Classification Search
CPC ........................ B07C 5/361; B07C 2501/0063
USPC .......................................................... 209/560
See application file for complete search history.

(56) References Cited

U.S. PATENT DOCUMENTS 5,632,589 A * 5/1997 Bray ....................... B61C 11/04 198/349.6
7,693,757 B2 * 4/2010 Zimmerman ........ G05D 1/0274 705/28
9,975,148 B2 * 5/2018 Zhu ........................... B07C 3/18
2007/0071585 A1 * 3/2007 Henkel ................. B66F 9/0755 414/471

FOREIGN PATENT DOCUMENTS

WO WO-2019036346 A1 * 2/2019 ............. B07C 3/008

* cited by examiner

*Primary Examiner* — Michael McCullough
*Assistant Examiner* — Molly K Devine

(57) ABSTRACT

A robotic sorting system for sorting delivery items in one or more destination bins (208A-N) is provided. The robotic sorting system includes at least one robot (500) that includes (i) a delivery system for receiving a delivery item, (ii) a control unit (204) for determining a destination bin (208) for the delivery item to be sorted and determining a destination path for the at least one robot (500) to reach the destination bin (208), and (iii) an inbuilt lifting unit (512) for lifting the delivery item on the delivery system vertically up to a height of the destination bin (208) by lifting the delivery system. The delivery system transfers the delivery item to the destination (208) upon reaching to the height of the destination bin (208).

14 Claims, 14 Drawing Sheets

SYSTEM AND METHOD FOR AUTOMATICALLY SORTING ITEMS IN A PLURALITY OF BINS USING ROBOTS

BACKGROUND

Technical Field

The embodiments herein generally relate to warehouse management, and more particularly, to a system and method for automatically sorting items in a plurality of destination bins using robots, for distribution.

Description of the Related Art

In general, order fulfillment is a complete process from point of sale inquiry to delivery of a product to a customer. An order fulfillment center includes a warehouse with a storage area and a packaging area. Nowadays, the internet makes it simple to order items or goods online. This, in turn, increases the volume of delivery items and packages for sorting and distribution. Generally, a sorting process is performed to categorize the delivery items or packages comprising the ordered items based on a destination for distribution. The items should reach the customers in a fast manner with accuracy to satisfy them. Hence, an effective solution is needed for sorting and delivering the ordered items to customers on time from warehouses.

In the conventional approach, the sorting and delivery process of ordered items or delivery items are performed by manual operation or by fixed automated systems that are difficult to scale up and require large infrastructure, space and increased installation time. In manual operation, the shortage of human labor for sorting during peak seasons is a major problem. This may lead to limited operation and results in customer dissatisfaction. Further, in the manual operation, there may be a chance of increasing the processing time, errors, mis sorting and shipment delay.

Automation helps to rectify the problems of manual operation in sorting and delivering the items to customers. In recent years, robotics technology has made a large impact on the world of e-commerce areas like logistics, distribution centers, and warehouses. The customers also get faster service and higher quality with this technology.

Existing automated approaches perform sorting and delivering the items using robots. However, these approaches are not effective with increasing sorting time and robot deficiency such as inability in determining obstacles on a path or alternate shortest path.

Accordingly, there remains a need for a system and method for sorting the items in minimum space with improved speed, flexibility, and high efficiency.

SUMMARY

In view of foregoing, an embodiment herein provides a robotic sorting system for automatically sorting delivery items in one or more destination bins. The robotic sorting system includes at least one robot which includes (a) an inbuilt lifting unit; (b) a delivery system that is positioned on top of the inbuilt lifting unit; and (c) a control unit that includes a processor. The at least one robot (i) receives a delivery item on the delivery system, from a feeding unit in a sorting area, (ii) receives information about a destination bin for the delivery item to be sorted, and determines a destination path for the at least one robot to reach the destination bin for sorting the delivery item, using the control unit, (iii) lifts, using the inbuilt lifting unit, the delivery item on the delivery system vertically up to a height of the destination bin by lifting the delivery system, and (iv) transfers, using the delivery system, the delivery item to the destination bin upon reaching to the height of the destination bin.

In some embodiments, the robotic sorting system includes at least one of a camera, a barcode scanner, and a volumetric scanner, that identifies the delivery item for determining the destination bin for the at least one robot and also captures the volumetric dimensions of the delivery item.

In some embodiments, the at least one robot includes at least one of a floor barcode scanning unit, a camera or a light detection and ranging (LIDAR) sensor that identifies a location of the at least one robot in the sorting area and sends location information associated with the least one robot to the control unit to localize the least one robot for reaching the destination bin.

In some embodiments, the control unit is configured to determine a destination path for the least one robot to reach a charging station for charging, based on a battery state of the least one robot.

In some embodiments, the inbuilt lifting unit includes a telescopic lifting unit or a scissor lifting unit or a hydraulic lifting unit or a pneumatic lifting unit.

In some embodiments, the at least one robot includes an obstacle detection sensor that detects obstacles in the destination path of the at least one robot. The control unit determines an alternative path for the at least one robot using an obstacle avoidance system to enable the at least one robot to reach the destination bin, when the obstacle detection sensor detects an obstacle in the destination path of the at least one robot.

In some embodiments, the robotic sorting system includes a robot control system that performs fleet management of fleet of the at least one robot and controls the robotic sorting system, and a database that stores at least one of logging information or delivery item information.

In some embodiments, the sorting area includes at least one of (i) one or more feeder areas, (ii) one or more robot walking areas, (iii) the one or more rack layout areas, (iv) one or more bagging areas, and (v) one or more crossing areas. One or more bagging areas are decoupled from the at least one robot, for ensuring safety, by vertically differentiating the one or more robot walking areas from the one or more bagging areas and trolleys passage area at the one or more crossing area.

In some embodiments, the one or more rack layout areas includes a sorting side that is coupled with the one or more robot walking areas and a bagging side that is coupled with the one or more bagging areas.

In some embodiments, the bagging area that is decoupled from the robotic sorting system for ensuring safety.

In some embodiments, the delivery system includes one or more of (i) a tilting plate, (ii) a conveyor, (iii) a push system, (iv) a sliding system, (v) a passive delivery system or (vi) a tilted mechanism on which the delivery item is placed to transfer the delivery item to the destination bin.

In some embodiments, the robotic sorting system includes an equipment control system that controls one or more equipments in the robotic sorting system. The one or more equipments include at least one the feeding unit, the camera, the barcode scanner, or the volumetric scanner.

In another aspect, a method for automatically sorting a delivery item in one or more bins using a robotic sorting system is provided. The robotic sorting system includes at least one robot. The method includes (i) receiving a delivery item on a delivery system of the at least one robot from a feeding unit in a sorting area, (ii) determining a destination bin on which the delivery item is to be sorted in the sorting area, (iii) automatically determining a destination path for the at least one robot to reach the destination bin in the sorting area, (iv) enabling, using a drive system, movement of the at least one robot to reach the destination bin according to the destination path (v) lifting, using an inbuilt lifting unit of the at least one robot, the delivery item up to a height of the destination bin by lifting the delivery system when the at least one robot is moving towards the destination bin, thereby reducing operation time of the at least one robot, and (vi) transferring, using the delivery system, the delivery item inside the destination bin upon reaching up to the height of the destination bin.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
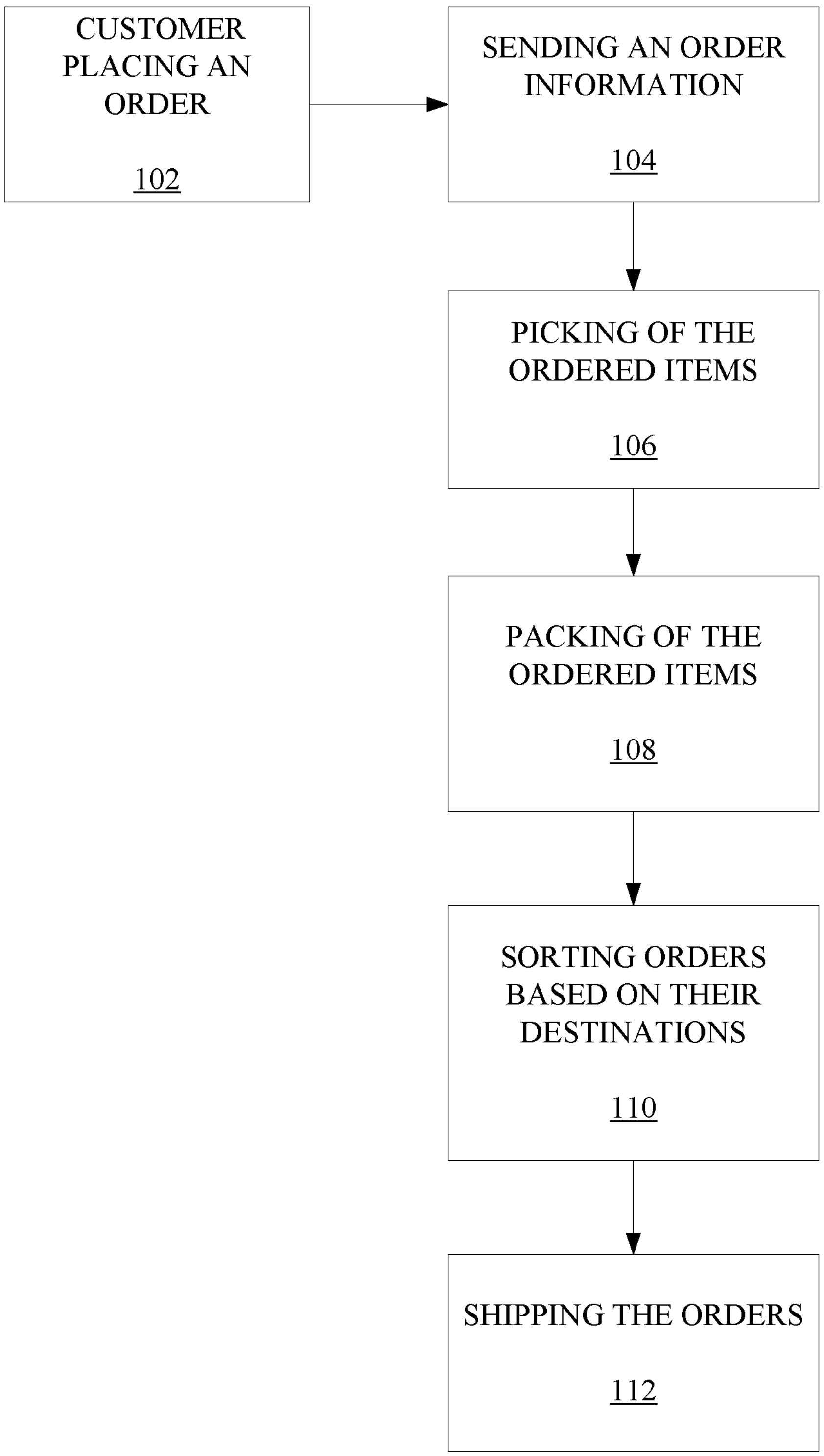
FIG. 1 illustrates a flow diagram showing an overall process of ordering and shipping an item.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Accordingly, there remains a need for a system or a method for automatically sorting items in minimum space with improved speed, flexibility, and high efficiency. The embodiments herein achieve this by proposing a system and method for automatically sorting one or more items in one or more destination bins which are placed in a sorting area using sorting robots for bagging and delivering sorted items. Referring now to the drawings, and more particularly to FIGS. 1 through 10, where similar reference characters denote corresponding features consistently throughout the figures, preferred embodiments are shown.

FIG. 1 illustrates a flow diagram showing an overall process of ordering and shipping an item. At step 102, a customer places an order of their desired items online or offline. At step 104, an order information is sent to a relevant warehouse where one or more items or one or more goods are stored. In some embodiments, the order information includes, but not limited to, an item name, an item specification, a customer information and the like. At step 106, a picking system picks order items and forwards to a next process step. At step 108, picked items are packed and labeled. In some embodiments, a label of the picked items includes, but not limited to, a destination address or a code indicating a destination with respect to which the items needs to be sorted. At step 110, packed and labeled items are sorted based on their respective destinations. In the preferred embodiment, the packed items are sorted by robots. In some embodiments, the items are sorted into different transportation units like bags, boxes, or pallets. At step 112, the transportation units including sorted items are shipped to the destination and received by the customer. In some embodiments, a facility is only a sortation center where incoming shipments are already packed and labelled and need to be sorted before they are shipped to the next destination.

Figure 2:
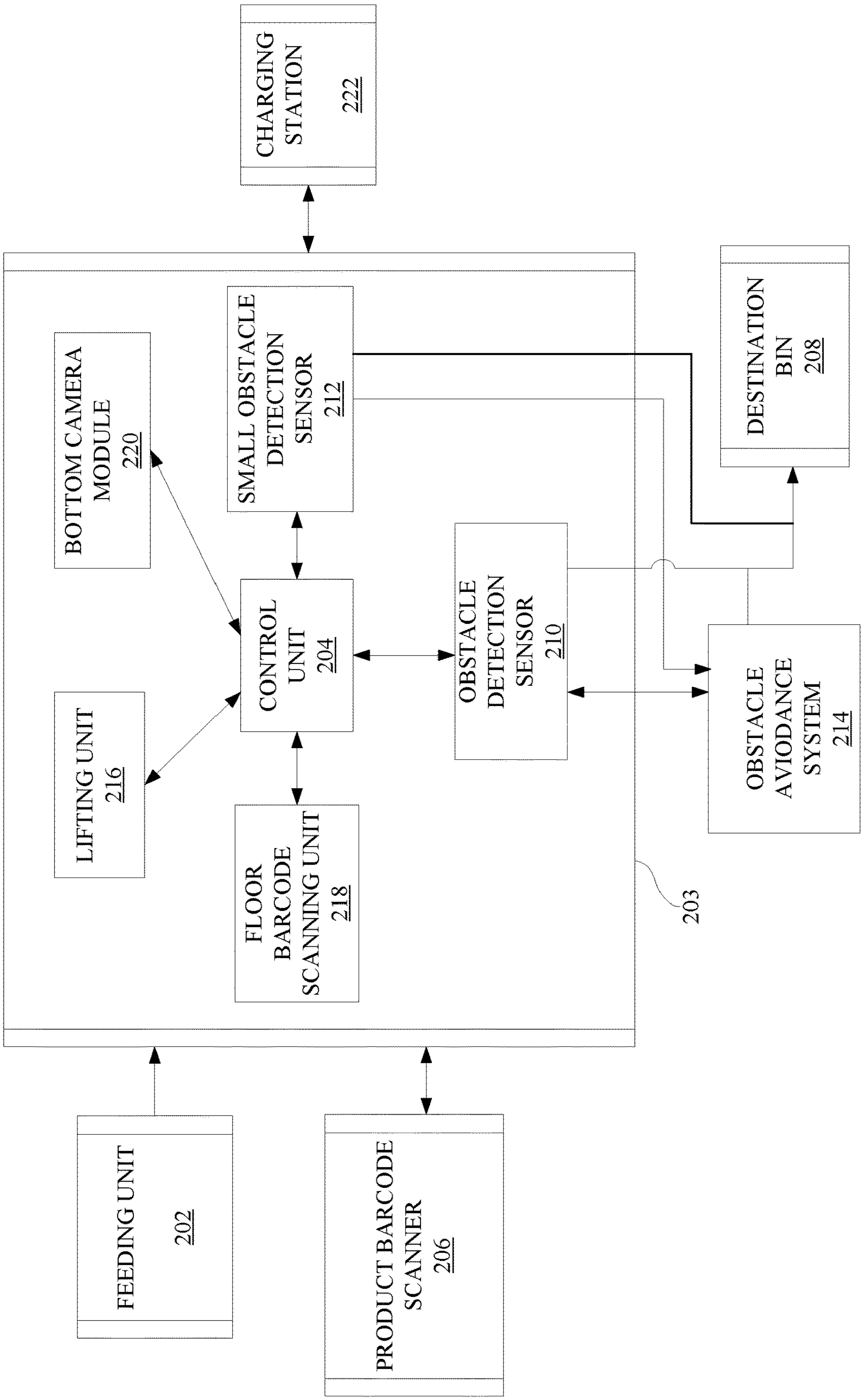
FIG. 2 is a block diagram which illustrates a system for automatically sorting delivery items in one or more destination bins for bagging and delivering sorted items, according to some embodiments herein.

FIG. 2 is a block diagram which illustrates a system for automatically sorting delivery items in one or more destination bins for bagging and delivering sorted items, according to some embodiments herein. The system includes one or more feeding units 202, at least one robotic system 203, a barcode scanner 206, a destination bin 208, a charging station 222 and an obstacle avoidance system 214. The one or more feeding unit 202 picks and feeds the delivery items on the robotic system 203. In some embodiments, the one or more feeding unit 202 is a human-operated feeding unit. In some embodiments, the one or more feeding unit 202 is an automated feeding unit. The robotic system 203 receives a delivery item from the one or more feeding unit 202 and starts a sorting process. In some embodiments, the robotic system 203 is an Automated Guided Vehicle (AGV) or Unmanned Ground Vehicle (UGV) that can carry the delivery items.

Figure 4A:
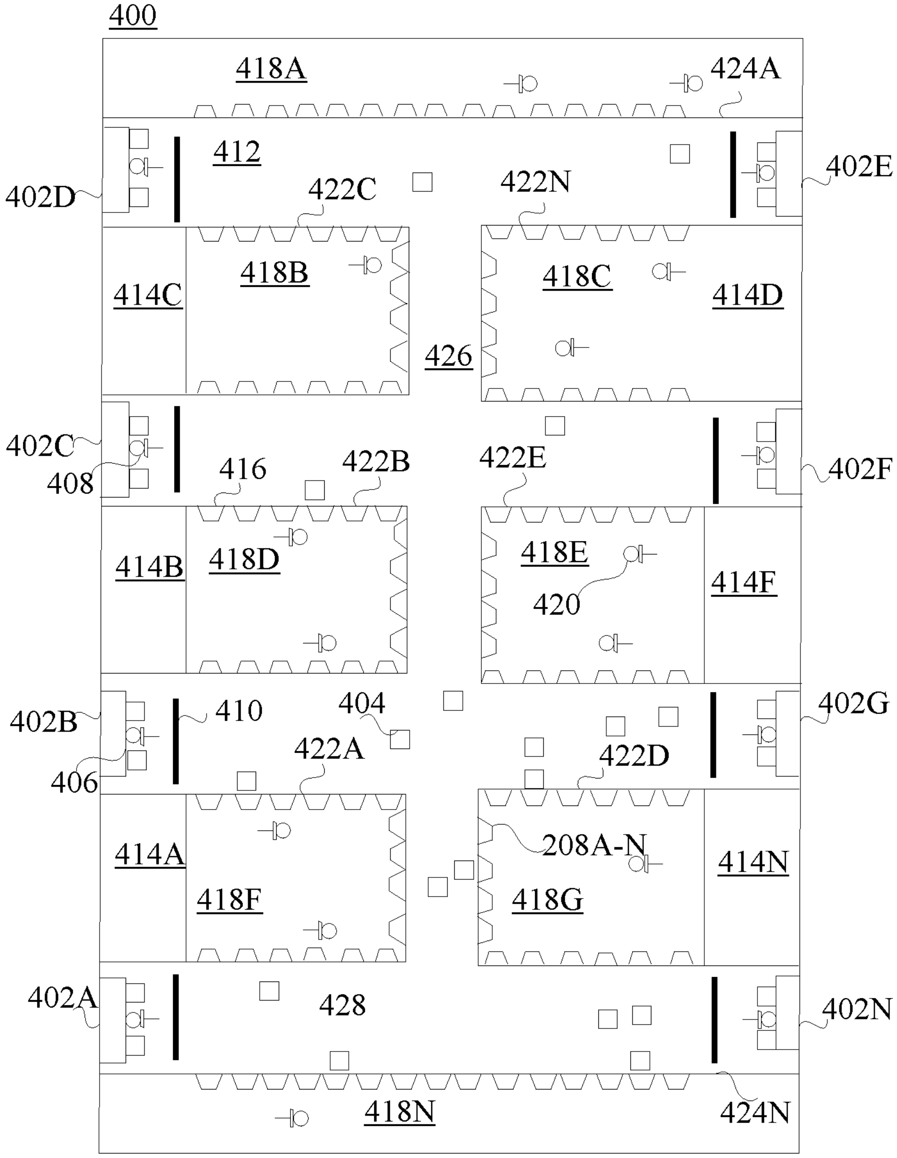
FIGS. 4A, 4B, and 4C illustrate layouts of a sorting area where the method of sorting as illustrated in FIG. 3 is to be executed, according to some embodiments herein.

The robotic system 203 includes one or more robots that include a control unit 204, an obstacle detection sensor 210, a small obstacle detection sensor 212, an inbuilt lifting unit 216, a floor barcode scanning unit 218, and a bottom camera module 220. The barcode scanner 206 may be presented in a feeder area that is outside of the one or more robots as shown in FIG. 4A. For example, the one or more robots may not include the barcode scanner 206 as similar to robots shown in FIGS. 4A-4C and FIGS. 5A-5C. The barcode scanner 206 scans a barcode printed on the delivery item. The control unit 204 receives scanned barcode from the barcode scanner 206 and processes the scanned barcode to determine a destination bin 208 at which the delivery item to be sorted. The control unit 204 determines a destination path (e.g. route) for the robotic system 203 to reach the destination bin 208. In some embodiments, the control unit 204 determines a shortest possible path for the delivery item to reach the destination bin 208. The obstacle detection sensor 210 optionally detects obstacles if any on the destination path of the robotic system 203. In some embodiment, the obstacle detection sensor 210 detects large to medium-sized obstacles in the destination path. The small obstacle detection sensor 212 detects small obstacles in the destination path accurately. If the obstacle detection sensor 210 and small obstacle detection sensor 212 detect an obstacle in the destination path, the obstacle detection sensor 210 and small obstacle detection sensor 212 communicates about detected obstacle to the control unit 204. The control unit 204 determines an alternate destination path to be followed by the robotic system 203 to reach the destination bin 208 for sorting the delivery item. In some embodiments, the control unit 204, using the obstacle avoidance system 214, determines the alternate destination path to be followed by the robotic system 203 to reach the destination bin 208 for sorting the delivery item. In some embodiments, the obstacle avoidance system 214 present inside the robotic system 203.

The floor barcode scanning unit 218 reads a barcode on a floor of the sorting area and localizes the robotic system 203 in the floor that is positioned with respective destination bin 208 for sorting the delivery item in the respective destination bin 208. In some embodiments, the floor of the sorting area is printed with a plurality of barcode which are mapped with corresponding destination bin 208. In some embodiments, the floor barcode scanning unit 218 reads the barcode on the floor of the sorting area and localizes the robotic system 203 in the floor that is positioned with respective destination bin 208 for sorting the delivery item in the respective destination bin 208 by mapping the barcode on the floor with the destination bin 208. In some embodiments, the floor barcode scanning unit 218, using the bottom camera module 220 scans the barcode present on the floor of the sorting area to localize the robotic system 203 on the floor. In some embodiments, the floor barcode scanning unit 218 reads barcodes mounted on a side of a robot movement area for localizing the robotic system 203.

In some embodiments, the robotic system 203 can be localized in the floor of the sorting area using light detection and ranging (LIDAR) or any other suitable method known in the art. In one embodiment, the obstacle detection sensor 210 includes, but not limited to an ultrasonic sensor, a lidar sensor, and an infrared (IR) sensor. In one embodiment, the small obstacle sensor 212 includes, but not limited to IR laser scanners.

The barcode scanner 206 scans the barcode of the delivery items placed on the robotic system 203 and the control unit 204 processes barcode data to determine the destination bin 208 for the robotic system 203 in which the delivery item is placed by the robotic system 203. In one embodiment, the robotic system 203 is designed with the inbuilt lifting unit 216 which raises the delivery item to a height of the destination bin 208 to transfer the delivery item into the destination bin 208. In one embodiment, the inbuilt lifting unit 216 maybe, but not limited to, a telescopic lifting unit, a scissor lifting unit, a hydraulic lifting unit or a pneumatic lifting unit. In some embodiments, the inbuilt lifting unit 216 simultaneously lifts the delivery item to the height of the destination bin 208 to transfer the delivery item into the destination bin 208 when the robotic system 203 is moving towards the destination bin 208, thereby reducing an operation time of the robotic system 203.

Figure 10:
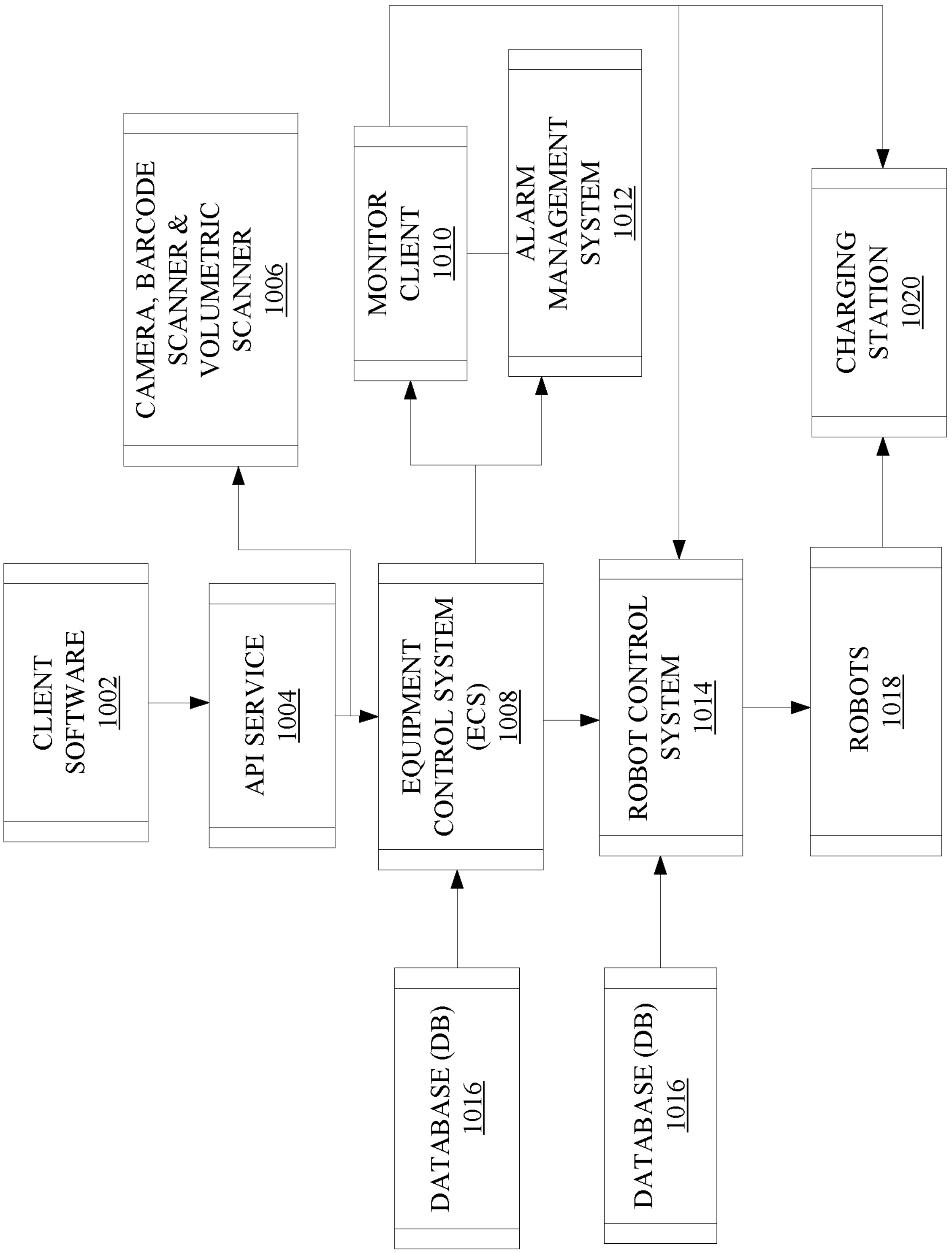
FIG. 10 illustrates a software system that controls a sorting system or a robotic sorting system for warehouse management or manufacturing management, according to some embodiments herein.

The charging station 222 charges batteries of the robotic system 203 based on a calculated battery state. In some embodiments, the robotic system 203, using the control unit 204, (i) calculates a battery state of the robotic system 203 when in operation (ii) determines the charging station 222 in the sorting area if the battery state of the robotic system 203 is lower than a threshold value (iii) determines a destination path for the robotic system 203 to reach the charging station 222 and (iv) enables the robotic system 203 for docking with the charging station 222 to initiate charging once the robotic system 203 reaches the charging station 222. In some embodiments, the robotic system 203 is controlled by a robot control system 1014 as shown in FIG. 10. The robot control system 1014 performs fleet management of fleet of the one or more robots of the robotic system 203. In some embodiments, one or more equipments in the robotic system 203 include the one or more feeding units 202, the barcode scanner 206, a volumetric scanner, the charging station 222, a camera, are controlled by an equipment control system 1008 as shown in FIG. 10.

Figure 3:
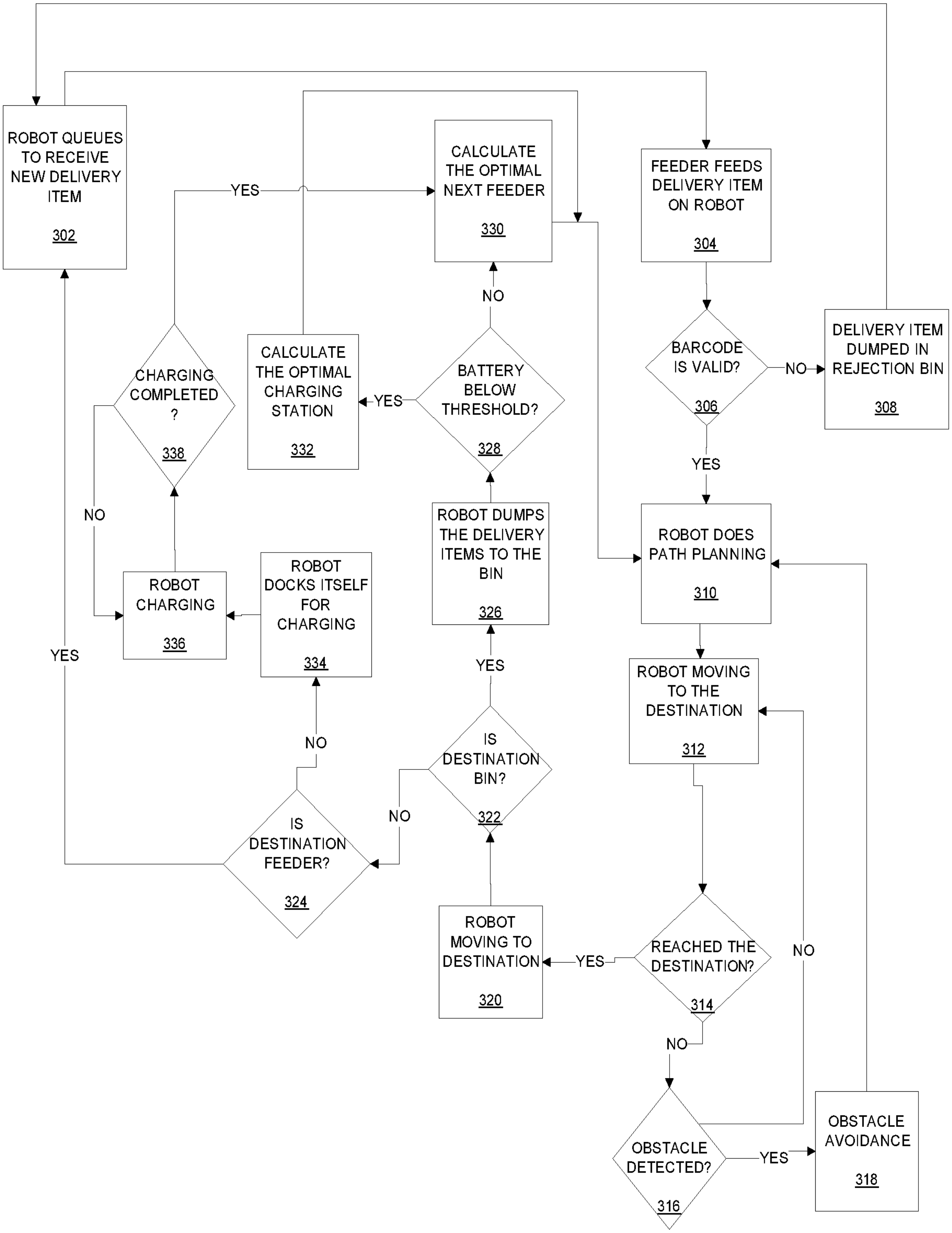
FIG. 3 is a block diagram which illustrates a method of sorting delivery items in one or more destination bins for bagging and delivering sorted items, according to some embodiments herein.

With reference to FIG. 2, FIG. 3 is a block diagram which illustrates a method of sorting delivery items in one or more destination bins for bagging and delivering sorted items, according to some embodiments herein. The method is applied to the system for sorting the delivery items as shown in FIG. 2.

Hereinafter, the method of sorting the delivery items according to some embodiments herein will be described in detail with reference to FIG. 3. At step 302, a robot queues in a line at a feeder location to receive a delivery item. In one embodiment, the delivery item can be any material that can be material handling. At step 304, the robot receives the delivery item from the one or more feeding units 202 in the feeder location. At step 306, the barcode scanner 206 scans a barcode printed on the delivery item for validating the barcode printed on the delivery item and determining the destination bin 208 on which the delivery item is to be sorted in a sorting area by processing scanned barcode. At step 308, the robot shifts the delivery item to a rejection bin, if the scanned barcode is not valid and queues back to the feeder location. At step 310, the robot determines, using the control unit 204, a destination path for the robot, if the scanned barcode is valid. At step 312, the robot moves towards the destination bin 208 once the robot receives a destination bin location by barcode scanning. At step 314, it is checked whether the destination has been reached or not. At step 316, if the destination has not been reached, it is checked whether an obstacle is detected in the destination path, by the obstacle detection sensor 210 and the small obstacle detection sensor 212. If the obstacle is detected, the robot goes to step 318 for obstacle avoidance. If there is no obstacle, then the robot goes back to step 312. At step 318, the robot does obstacle avoidance and determines an alternate path for the robot to reach the destination bin 208. At step 320, the robot moves to the destination until it has been reached. At step 322, it is checked whether the destination bin 208 is reached or not. At step 324, if the destination bin 208 is not reached, it is checked whether the destination is a feeder or feeding unit or not. If the destination is the feeder, the robot goes back to step 302. At step 326, the robot dumbs the delivery item in the destination bin 208, if the destination is the destination bin 208. At step 328, it is checked whether a battery state of the robot is below a threshold or not. At step 330, if the battery state of the robot is above the threshold, the next optimal feeder is calculated and the robot goes to step 310. At step 332, if the battery state of the robot is below the threshold, an optimal charging station is calculated and then the robot goes to step 310. At step 334, if the destination of the robot is a charging station, the robot docks itself to the charging station 222. At step 336, the charging of the robot starts and the robot goes to step 330 once the charging is completed. At step 338, if the charging is not completed, the robot goes to step 336 and then goes to step 330.

With reference to FIG. 2, FIGS. 4A, 4B, and 4C illustrate layouts of a sorting area where the method of sorting as illustrated in FIG. 3 is to be executed, according to some embodiments herein. In some embodiments, a layout 400A with one or more crossing areas 414A-N as shown in FIG. 4A may use for sorting delivery items in larger areas and may also work if conveyors are used for feeding the delivery items in the sorting area. The layout 400A includes (i) one or more feeder areas 402A-N, where the delivery items arrive for feeding to a robot 404 that waits for its turn to receive a delivery item and move to the destination bin 208, (ii) a feeding position 406 in each of the one or more feeder areas 402A-N from where the robot 404 receives the delivery item, (iii) a feeder 408 in the feeding position 406 of each of the one or more feeder areas 402A-N that feeds the delivery items on the robot 404, (iv) a barcode and volumetric scanner 410 in each of the one or more feeder areas 402A-N that scan the delivery items before or after the delivery items are transferred on the robot 404, (v) one or more robot walking areas 412, where the robot 404 moves on a way to a respective sorting location, (vi) one or more crossing areas 414A-N which has space for robot passage and there is an entry-exit door for baggers and trolleys to pass the one or more crossing areas 414A-N, (vii) a rack layout border 416 that decouples the one or more robot walking areas 412 and one or more bagging areas 418A-N, (viii) one or more destination bins 208A-N in which the delivery items are transferred, (ix) the one or more bagging areas 418A-N, (x) a bagger 420 (xi) one or more rack layout areas. In some embodiments, the one or more rack layout areas includes one or more racks arranged in at least one of linear arrangements 424A-N at top and bottom ends of the rack layout area or U shape 422A-N.

In some embodiments, the one or more racks include the one or more destination bins 208A-N that are arranged vertically one on the top of another in each of the one or more of racks. In some embodiments, the one or more robot walking areas 412 is at least one of a longitudinal robot walking area 428 or a lateral robot walking area 426. In some embodiments, there is at least one crossing of the longitudinal robot walking area 428 with the lateral robot walking area 426.

In some embodiments, the bagger 420 is human. In some embodiments, the bagger 420 is an automated machine. In one embodiment, a weight scale in the feeding position 406 calculates a weight of the delivery items. The weight is calculated by subtracting total weight with robot weight. In one embodiment, the feeder 408 is a human. In one embodiment, the feeder 408 is an automated machine.

In some embodiments, the one or more crossing areas 414A-N that enable the one or more robot walking areas 412 to decouple from one or more baggers and a trolleys passage area connecting the one or more bagging areas 418A-N to enable unhindered passage for the robot 404. In some embodiments, the decoupling is achieved by vertically differentiating the one or more robot walking areas 412 from the one or more baggers and trolleys passage area at the one or more crossing areas 414A-N.

In some embodiments, the one or more robot walking areas 412 are coupled with a sorting side of the one or more rack layout areas. In some embodiments, the one or more bagging areas 418A-N are coupled with a bagging side of the one or more rack layout areas where sorted delivery items are bagged for distribution, in order to reduce the transition time, congestion and bagging operation time.

In some embodiments, the linear arrangements 424A-N at top and bottom ends of the rack layout area have two sides that include a sorting side coupled to the one or more robot walking areas 412 and a bagging side coupled to the one or more bagging areas 418A-N. The robot 404 receives the delivery item from the one or more feeding areas 402A-N and takes an efficient route to the sorting side of the one or more rack layout areas, to the one or more destination bins 208A-N and shifts the delivery item to the one or more destination bins 208A-N, which can be removed from the bagging side at the one or more bagging areas 418A-N.

In some embodiments, the U shape 422A-N rack layout area has four sides that includes one or more sorting sides which are coupled to the one or more robot walking areas 412 and one or more bagging sides coupled to the one or more bagging areas 418A-N. The robot 404 receives the delivery item from the one or more feeding areas 402A-N and takes the efficient route to the one or more sorting sides of the one or more rack layout areas, to the one or more destination bins 208A-N and shifts the delivery item to the one or more destination bins 208A-N, which can be removed from the one or more bagging sides at the one or more bagging areas 418A-N. In some embodiments, at least one side of the U shape 422A-N rack layout area is one or more crossing areas 414A-N. In some embodiments, the combination of the U shape 422A-N rack layout area and the linear arrangements 424A-N at top and bottom ends of the rack layout area is used.

In some embodiments, the robot 404 lifts the delivery item vertically to a height of the destination bin 208 using the inbuilt lifting unit 216, at the one or more robot walking areas 412. In some embodiments, on reaching the destination bin 208, the robot 404 shifts the delivery item to the destination bin 208 from the sorting side of the rack layout area.

In some embodiments, the method for automatically sorting a delivery item in a one or more destination bins using the robotic system 203 or the robot 404 includes simultaneously lifting, using the inbuild lifting unit 216, the delivery item to the height of the destination bin 208 to transfer the delivery item into the destination bin 208 when the robotic system 203 or the robot 404 is moving towards the destination bin 208, thereby reducing operation time of the robotic system 203 or the robot 404, wherein the inbuilt lifting unit 216 includes a telescopic lifting unit or a scissor lifting unit or a hydraulic lifting unit or a pneumatic lifting unit. The robotic system 203 or the robot 404 includes a delivery system that includes one or more of (i) a tilting plate, (ii) a conveyor, (iii) a push system, (iv) a sliding system, (v) a passive delivery system or (vi) a tilted mechanism on which the delivery item is placed to transfer the delivery item to the destination bin 208.

According to the layout 400A as shown in FIG. 4A, the one or more bagging areas 418A-N is decoupled from the one or more robot walking areas 412. This, in turn, decouples the bagger 420 from the robot 404 to ensure safety.

In some embodiments, a sequence of arrangements of the rack layout area is (i) linear arrangements 424A-N at top and bottom ends of the rack layout area, (ii) U shape 422A-N rack layouts. The at least one of the linear arrangement 424A rack layout area or the U shape 422A rack layout area are coupled to the one or more robot walking areas 412 that are arranged between at least one of the linear arrangement 424A rack layout area or the U shape 422A rack layout area. The one or more feeder areas 402A-N is connected to the one or more robot walking areas 412 as shown in FIG. 4A. As an example, the robot 404 picks up a delivery item from the feeder 402A, the delivery bin 208 is located at one of the racks in right sorting side at the U shape 422D layout area, arranged at the rack on a vertical level 3, the robot 404 lifts the delivery item to the corresponding height of the delivery bin 208 at level 3, while passing through the longitudinal walking area 428 and stops in front of the rack where identified destination bin 208 is located before transferring the delivery item to the destination bin 208 from the sorting side of the rack. The bagger located at the bagging area 418G may take out the delivery item from the bagging side of the rack at 422D from where the delivery item may be taken out of the layout 400A from the crossing area 414D for dispatch.

In some embodiments, one or more racks are arranged in the linear arrangements 424A-N with one or more destination bins 208A-N that are arranged vertically one above another in each rack.

Figure 4B:
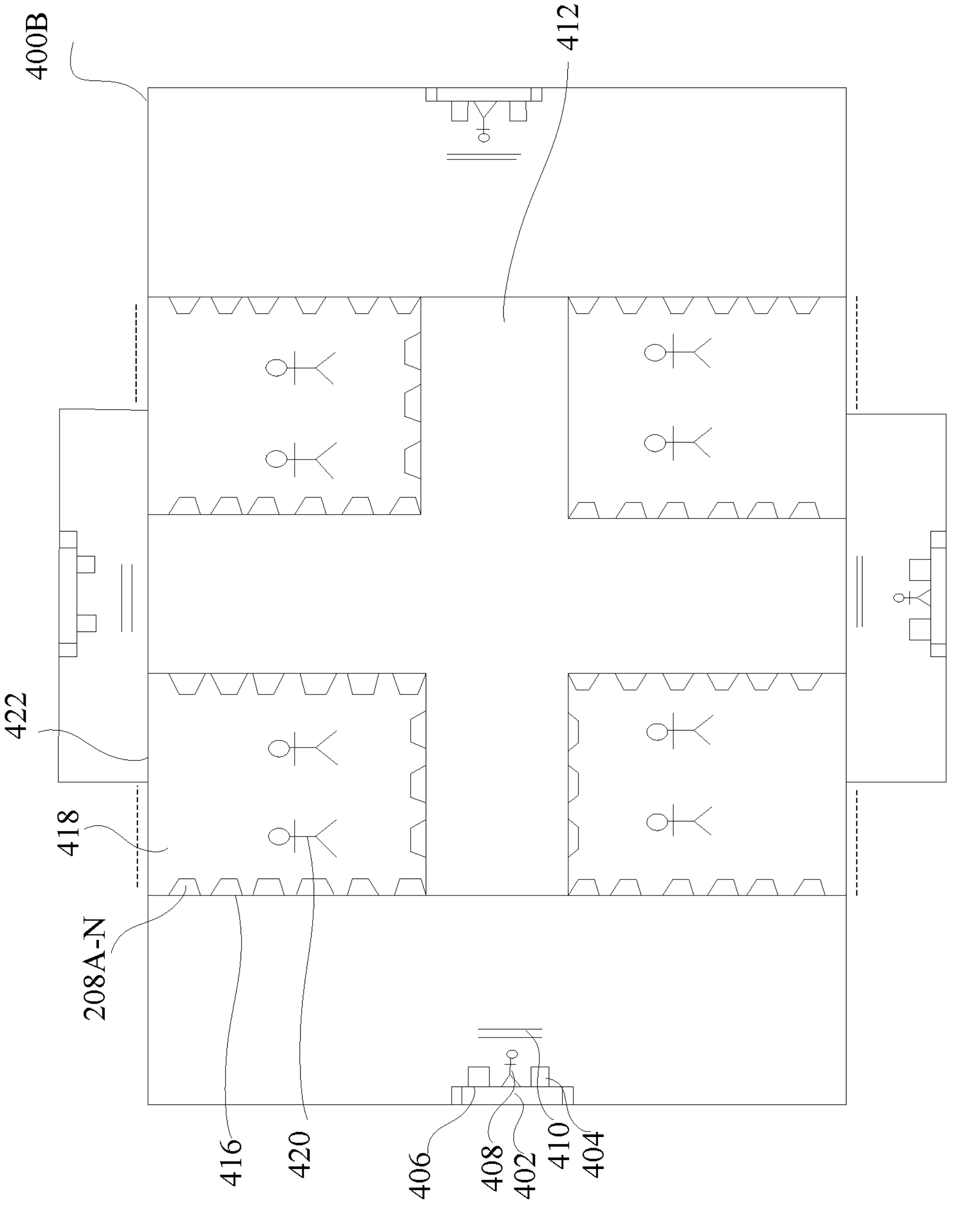

In another embodiment, a layout 400B of the sorting area does not have one or more crossing areas 414A-N as shown in FIG. 4B which is useful if conveyors are not used for transferring the delivery items to a feeding unit. The layout 400B includes all the components as described in the layout 400A except the one or more crossing areas 414A-N. In some embodiments, the one or more racks include one or more destination bins 208A-N that are vertically arranged one on the top of another.

Figure 4C:
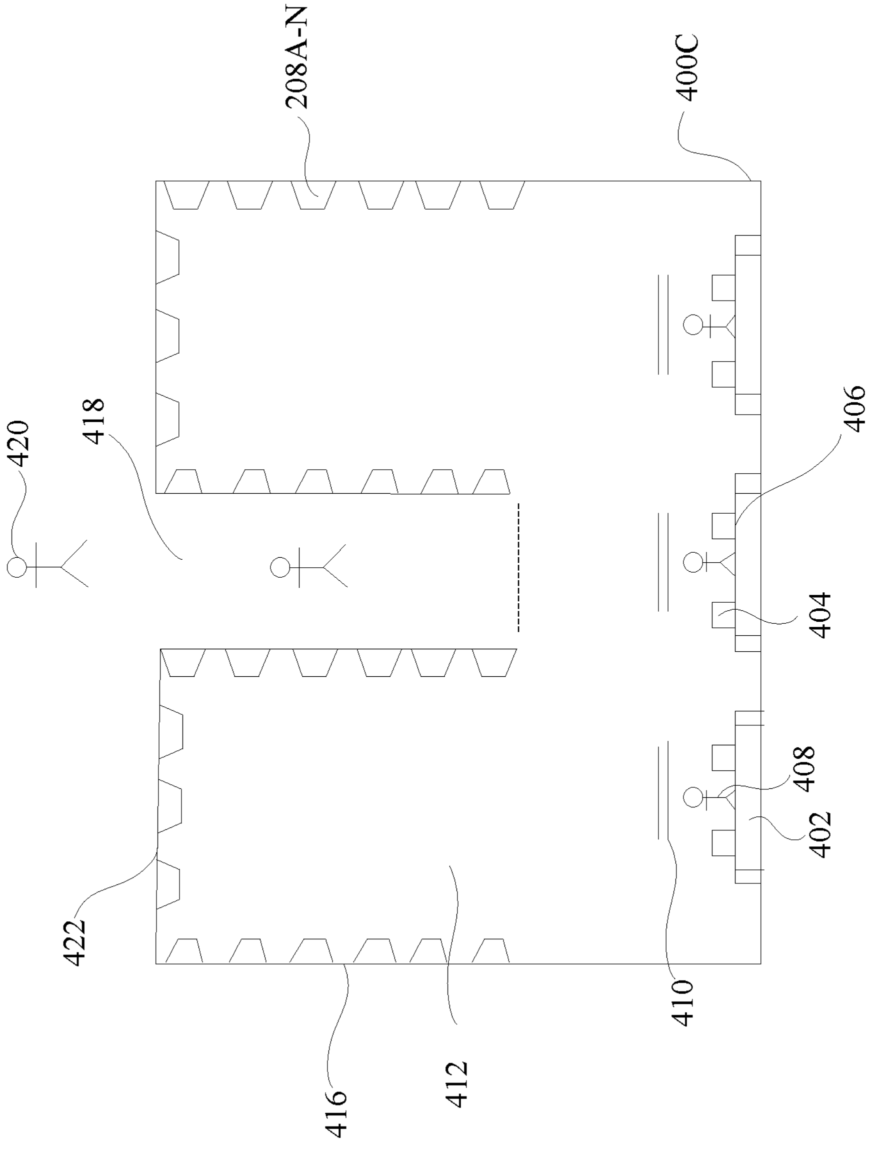

In one embodiment, a layout 400C of the sorting area with a smaller number of racks and through put as shown in FIG. 4C is used for small scale installation. The layout 400C includes at least two U shape rack 422 arrangements with the one or more destination bins 208A-N that are vertically arranged one on the top of another in each of the one or more racks in U shape rack 422 arrangements. In some embodiments, the one or more racks are arranged in U shape 422A-N includes three sides with the one or more destination bins 208A-N that are suitably arranged in U shape according to the layout of the sorting area.

In some embodiments, the one or more racks include both a bagging side where a bagging operation occurs and a sorting side where the sorting operation occurs.

According to the embodiments herein, the rack layout as shown in FIG. 4A for an arrangement of the one or more destination bins 208A-N in vertically one above another helps to reduce the robot 404 travel time, congestion and also reduces the bagging operation time.

In some embodiments, a number of rack layout and a number of destination bins are increased or decreased based on a size of a warehouse or a material handling area.

In some embodiments, the robot 404 includes a tilting plate in which the delivery item is placed, a robot body which includes all the components like battery, motors, drive systems, controllers or control unit and computers, an On or Off switch that enables to turn on and off the robot 404, a charging pin, an emergency stop switch for the safety and an inbuilt lifting unit which helps to lift the tilting plate vertically up to the height of the one or more destination bins 208A-N. In some embodiments, the robot includes a conveyor, a push system, a sliding systema passive delivery system or a tilted mechanism for receiving and transferring the delivery item to the destination bin 208.

In one embodiment, the robot 404 rotates the tilting plate to shift the delivery item to the destination bin 208. In one embodiment, the robot 404 includes a small cross belt conveyor that moves the delivery items to the destination bin 208 from the robot 404. The charging pin of the robot 404 acts as an access point for charging wires to be connected to the robot 404. In one embodiment, the charging is done manually. In one embodiment, the charging is done by autonomously using docks. The emergency stop switch is used to deactivate the robot 404 instantly in an emergency situation. In some embodiments, the emergency stop switch is activated manually. In some embodiments, the emergency stop switch is activated automatically during the emergency situation. The inbuilt lifting unit of the robot 404 lifts the tilting plate vertically to shift the delivery items to the destination bin 208

In some embodiments, the robot 404 further includes two or more power wheels, a floor barcode scanning unit and one or more free wheels for support. In some embodiments, the two or more power wheels include a motor to lead a transmission system of the robot 404. In some embodiments, the transmission system connects the motor and the two or more power wheels. In one embodiment, the motor includes, but not limited to brushless direct current electric (BLDC) motor or a direct current (DC) motor or an alternating current (AC) motor. In one embodiment, the drive system can be, but not limited to a motorized drive system or an engine based drive system. The floor barcode scanning unit reads barcodes on a floor and localizes the robot 404 in an environment. In one embodiment, the robot 404 can be localized in the environment using a camera, a light detection and ranging (LIDAR) or any other suitable method known in the art. The free wheels give necessary support to the robot 404. In one embodiment, the robot 404 can comprise zero or more free wheels for movement across the one or more robot walking areas 412 depending on a robot design.

In some embodiments, the emergency stop switch is another stop switch for quick accessibility in emergency events. The robot 404 may include a front camera module, an obstacle detection sensor and a small obstacle detection sensor.

In one embodiment, the front camera module can be used, but not limited, for scanning and mapping a location of the robot 404 in the environment. The obstacle detection sensor detects obstacles accurately in a destination path of the robot 404 and makes sure that the robot 404 does not meet with an accident. In one embodiment, the obstacle detection sensor includes, but not limited to an ultrasonic sensor, a lidar sensor, and an infrared (IR) sensor. The small obstacle detection sensor detects very small obstacles accurately in the destination path of the robot 404 for smooth robot operation. In one embodiment, the small obstacle detection sensor includes, but not limited to, IR laser scanners.

In one embodiment, the inbuilt lifting unit includes, but not limited to a telescopic lifting unit, a scissor lifting unit, a hydraulic lifting unit, and a pneumatic lifting unit. In one embodiment, the robot 404 is moved to a destination bin location and simultaneously the robot 404 lifts the tilting plate to a level of destination bin 208 and transfers the delivery item. This saves the time of the sorting process. In some embodiments, a robot control system 1014 as shown in FIG. 10 performs fleet management of fleet of the robot 404. In some embodiments, one or more equipments that include the feeder 408, the barcode and volumetric scanner 410, are controlled by an equipment control system 1008 as shown in FIG. 10.

Figure 5A:
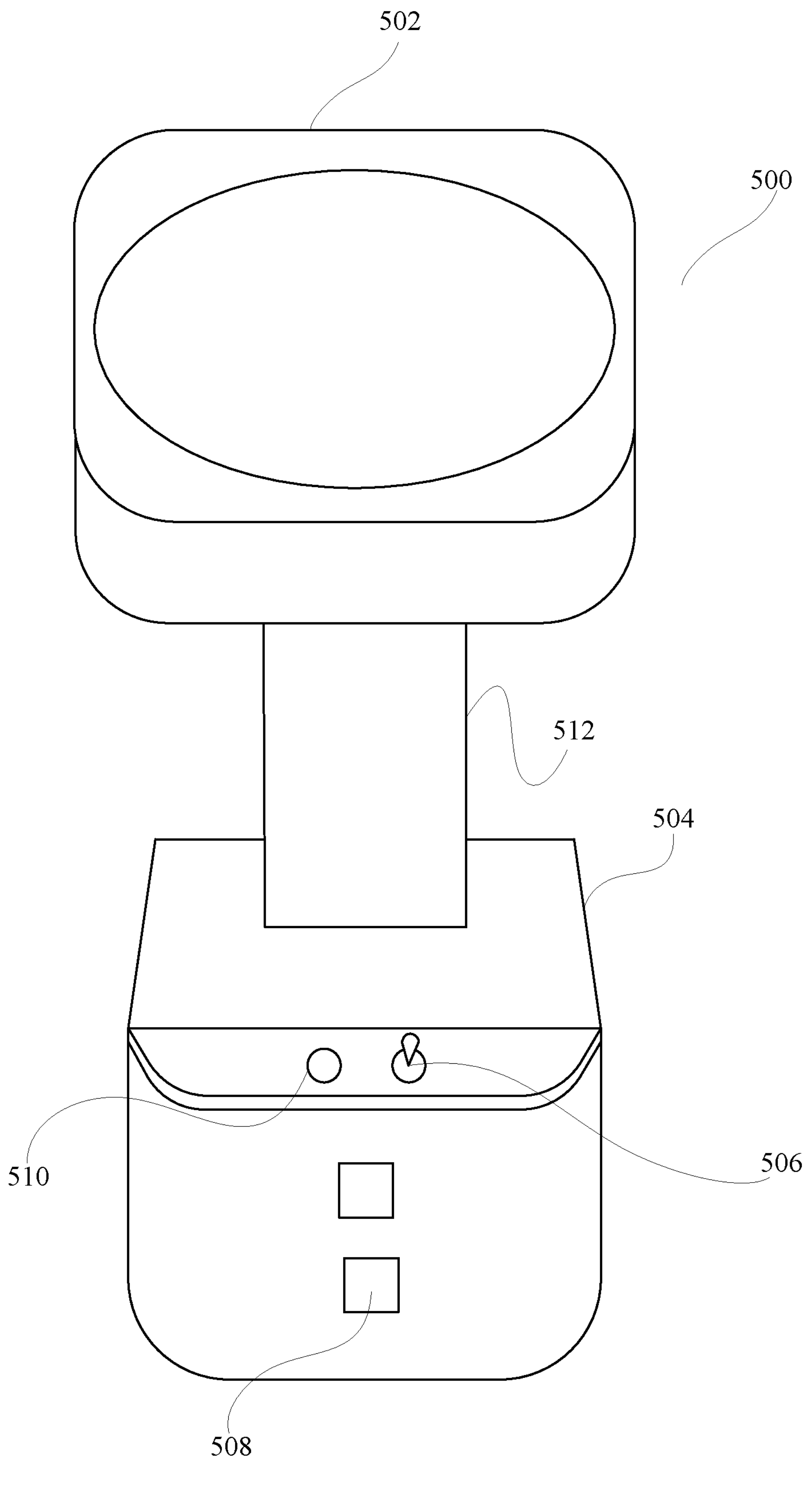
FIG. 5A is a top view of a robot that is used for executing the method of sorting as illustrated in FIG. 3, according to some embodiments herein.

FIG. 5A is a top view of a robot 500 that is used for executing the method of sorting as illustrated in FIG. 3, according to some embodiments herein. The robot 500 includes a tilting plate 502 in which a delivery item is placed, a robot body 504 which includes components like battery, motors, drive systems, controllers or control unit and computers, an On or Off switch 506 that enables to turn on and off the robot 500, a charging pin 508, an emergency stop switch 510 for safety and an inbuilt lifting unit 512 which helps to lift the tilting plate 502 vertically up to a height of the destination bins. In some embodiments, the robot 500 includes (i) a conveyor, (ii) a push system, (iii) a sliding system, (iv) a passive delivery system or (v) a tilted mechanism for receiving and transferring the delivery item to a destination bin.

In one embodiment, the robot 500 rotates the tilting plate 502 to shift the delivery items to the destination bin. In one embodiment, the robot 500 includes a conveyor that moves the delivery item to the destination bin from the robot 500. The charging pin 508 of the robot 500 acts as an access point for charging connection to the robot 500. In one embodiment, charging is done manually. In one embodiment, charging is done by autonomously using docks. The emergency stop switch 510 is used to deactivate the robot 500 instantly in an emergency situation. In some embodiments, the emergency stop switch 510 is activated manually. In some embodiments, the emergency stop switch 510 is activated automatically during the emergency situation. The inbuilt lifting unit 512 of the robot 500 lifts the tilting plate 502 vertically to shift the delivery item to the destination bin based on different height of the destination bin. In one embodiment, the inbuilt lifting unit 512 can be, but not limited to a telescopic lifting unit, a scissor lifting unit, a hydraulic lifting unit, or a pneumatic lifting unit.

Figure 5B:
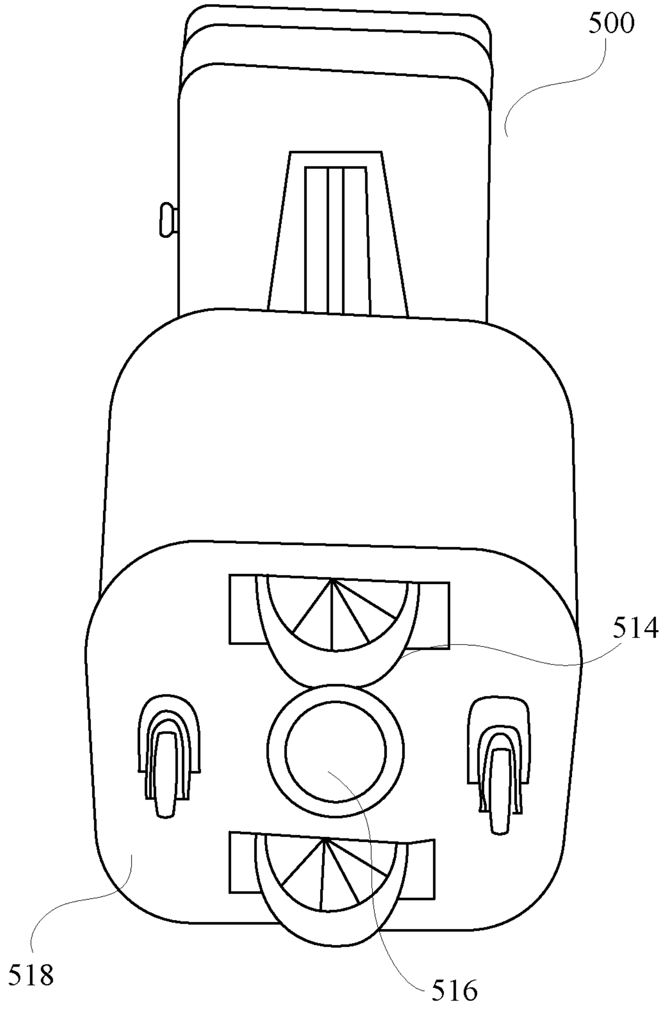
FIG. 5B is a bottom view of a robot that is used for executing the method of sorting as illustrated in FIG. 3, according to some embodiments herein.

FIG. 5B is a bottom view of a robot 500 that is used for executing the method of sorting as illustrated in FIG. 3, according to some embodiments herein. The robot 500, further includes two or more power wheels 514, a floor barcode scanning unit 516 and a free wheel 518 for support. In some embodiments, the two or more power wheels 514 includes a motor to lead a transmission system of the robot 500.

In some embodiments, the transmission system connects the motor and the two or more power wheels 514. In one embodiment, the motor includes, but not limited to a brushless direct current electric (BLDC) motor or a direct current (DC) motor or an alternating current (AC) motor. In one embodiment, the drive system can be, but not limited to a motorized drive system or an engine based drive system. The floor barcode scanning unit 516 reads barcodes on a floor and localizes the robot 500 in an environment. In one embodiment, the robot 500 can be localized in the environment using a camera, a light detection and ranging (LIDAR) or any other suitable method known in the art. The free wheel 518 gives the necessary support to the robot 500. In one embodiment, the robot 500 can comprise zero or more free wheel 518 depending on a robot design.

Figure 5C:
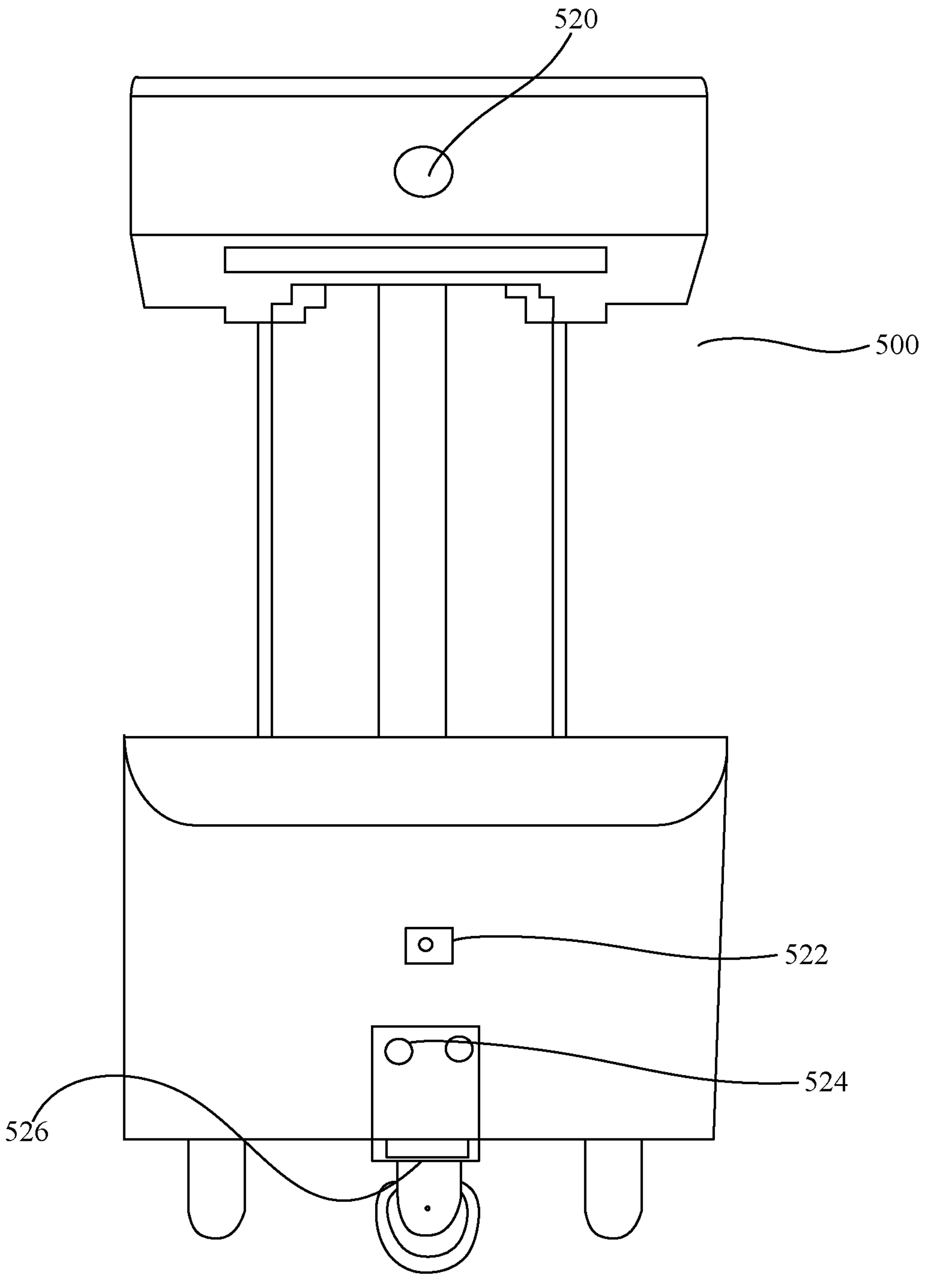
FIG. 5C is a front view of a robot that is used for executing the method of sorting as illustrated in FIG. 3, according to some embodiments herein.

FIG. 5C is a front view of a robot 500 that is used for executing the method of sorting as illustrated in FIG. 3, according to some embodiments herein. The robot 500, further includes an emergency stop switch 520 which is another stop switch for quick accessibility in emergency events, a front camera module 522, an obstacle detection sensor 524 and a small obstacle detection sensor 526.

In one embodiment, the front camera module 522 can be used, but not limited, for scanning and mapping a location of the robot 500 in an environment. The obstacle detection sensor 524 detects obstacles accurately in a destination path of the robot 500 and makes sure that the robot 500 does not meet with an accident. In one embodiment, the obstacle detection sensor 524 includes, but not limited to an ultrasonic sensor, a light detection and ranging (LIDAR) sensor, and an infrared (IR) sensor. The small obstacle detection sensor 526 detects very small obstacles accurately in the destination path of the robot 500 for smooth robot operation. In one embodiment, the small obstacle detection sensor 526 includes, but not limited to, infrared (IR) laser scanners. In some embodiments, a robot control system 1014 as shown in FIG. 10 performs fleet management of fleet of the robot 500.

FIGS. 6A-6D illustrate schematic diagrams of a robot in one or more lifting positions for placing delivery items in one or more destination bins, according to some embodiments herein.

Figure 6A:
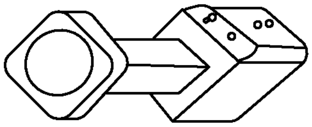
FIGS. 6A-6D illustrate schematic diagrams of a robot in one or more lifting positions for placing delivery items in one or more destination bins, according to some embodiments herein.
Figure 6B:
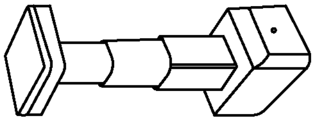
Figure 6C:
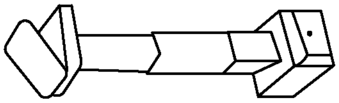
Figure 6D:
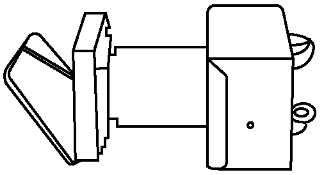

FIG. 6A shows a normal position of a robot with a tilting plate to carry the delivery items, according to an embodiment herein. In a preferred embodiment, the robot is designed with an inbuilt lifting unit. FIG. 6B shows a first elevated position of the robot by lifting a tilting plate of the robot using an inbuilt lifting unit, according to an embodiment herein. FIG. 6C shows a second elevated position of the robot by lifting a tilting plate of the robot using an inbuilt lifting unit, according to an embodiment herein. FIG. 6D shows an elevated position of a tilting plate of the robot by rotating the tilting plate of the robot for shifting the delivery items to a destination bin once the robot reaches a height of a right destination bin, according to an embodiment herein. After shifting the delivery items on the right destination bin, the inbuilt lifting unit lowers the height of the robot to the normal position as shown in FIG. 6A.

In one embodiment, the inbuilt lifting unit includes, but not limited to a telescopic lifting unit, a scissor lifting unit, a hydraulic lifting unit, and a pneumatic lifting unit. In one embodiment, the robot is moved to a right destination bin location and simultaneously the robot lifts the tilting plate to the height of the right destination bin. This saves time of a sorting process.

Figure 7:
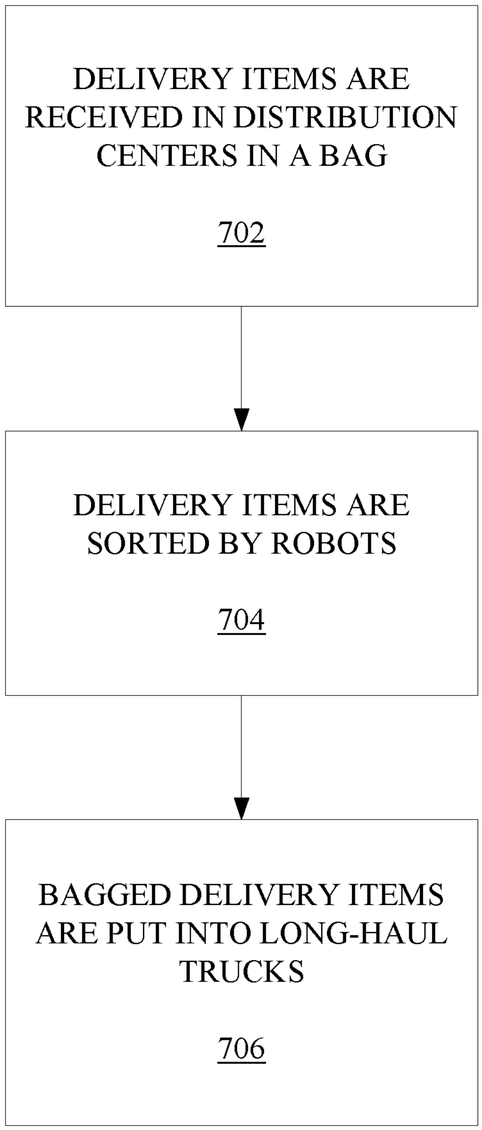
FIG. 7 is a flowchart which illustrates an overview of delivery item processing method, according to some embodiments herein.

FIG. 7 is a flowchart which illustrates an overview of delivery processing method according to some embodiments herein. At step 702, delivery items in bags are brought to a distribution center or a dedicated sorting area where the delivery items are sorted. At step 704, the delivery items are sorted using robots as illustrated in FIG. 3. In one embodiment, the robots are automatic guided vehicles (AGV)

which have a structure design as described in FIGS. 5A-5C. At step 706, sorted delivery items are bagged and put into trucks for further connection.

Figure 8:
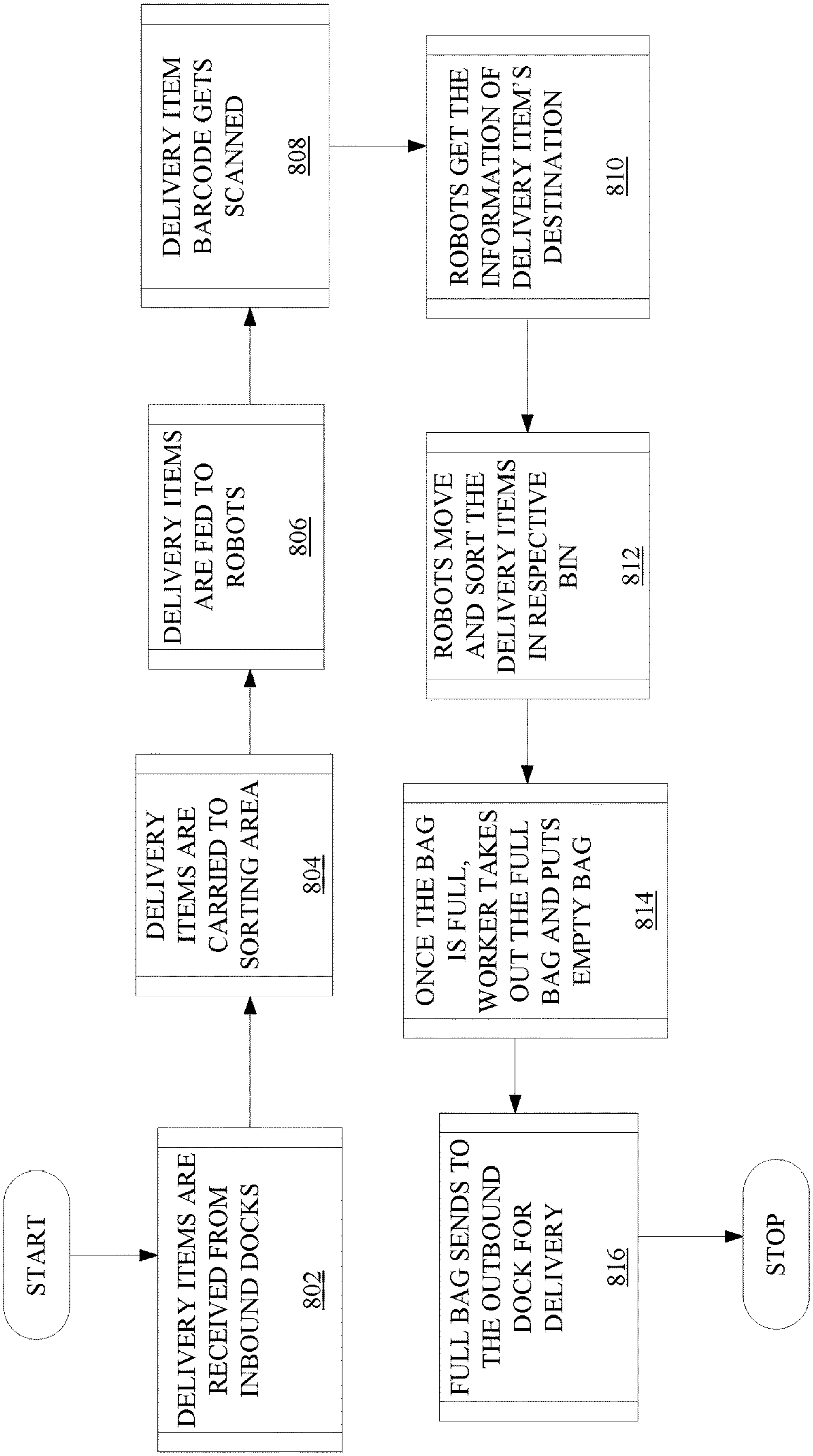
FIG. 8 illustrates a method for sorting delivery items in one or more destination bins using robots, according to some embodiments herein.

FIG. 8 illustrates a method for sorting delivery items in one or more destination bins using robots, according to some embodiments herein. At step 802, the delivery items in bags are received in inbound docks of area. At step 804, the delivery items from the inbound docks are carried to a feeder area where a sorting process happens. In one embodiment, the feeder area can be with a feeding station to pick the delivery items. In one embodiment, the feeder area can be with a human who will be picking the delivery items. At step 806, the delivery items are fed on the robots one by one from different feeding stations. At step 808, a barcode on the delivery items is scanned using a barcode scanner. At step 810, the barcode scanner resolves barcode data to a destination bin number for the robots and sends it to the robots. At step 812, after getting the destination bin information, the robots move to a destination bin 208 and transfers the delivery items to the destination bin 208 that has a bag to accommodate many delivery items. At step 814, the bag is packed and removed from a bagging side of a rack, when the bag is full and a new empty bag is placed on the empty destination bin 208 for receiving next delivery item by the robots. At step 816, packed full bag is sent to an outbound dock for connecting the packed full bags to transporters for delivery.

Figure 9:
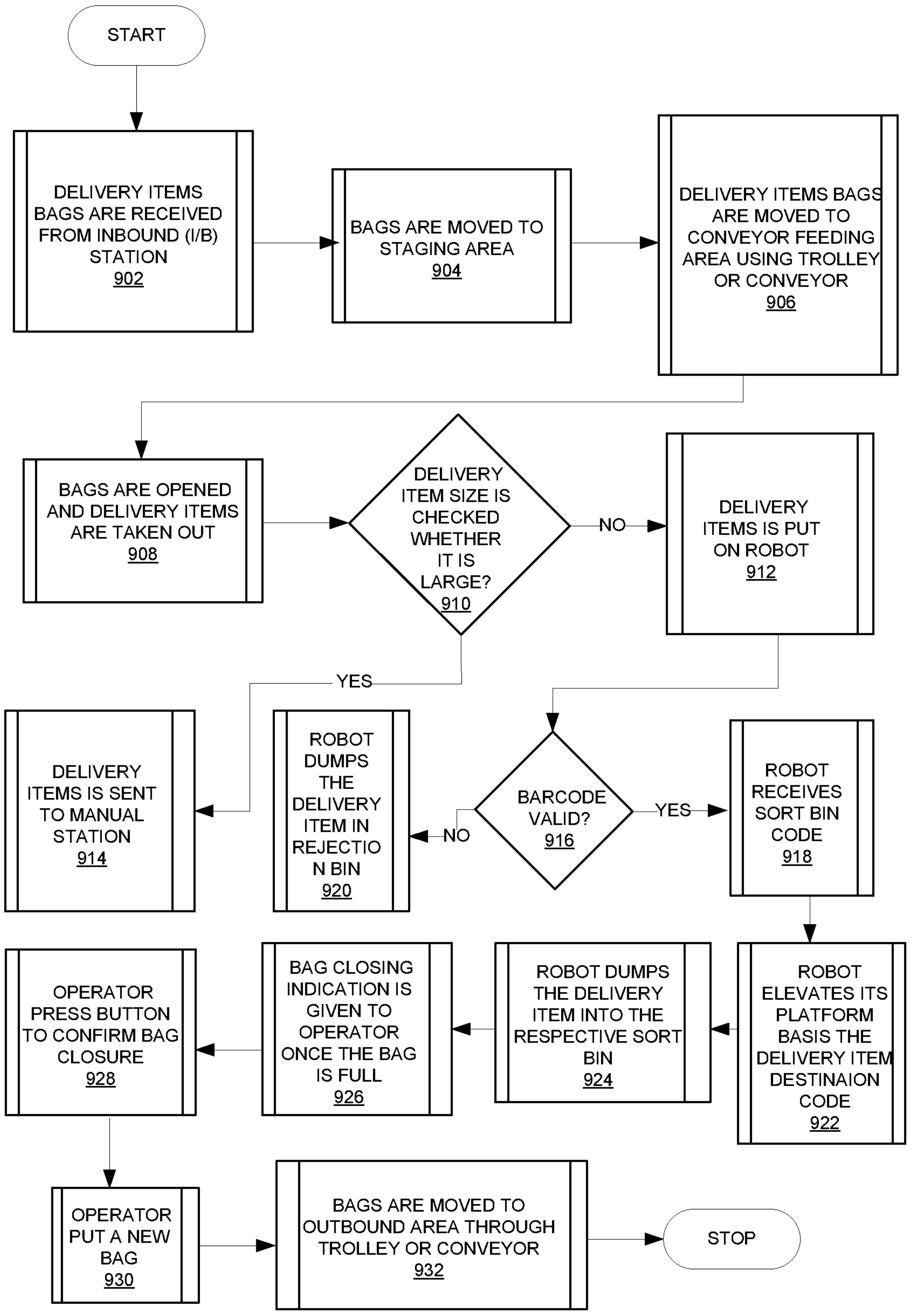
FIG. 9 is a block diagram that illustrates an overall view of a method for processing delivery items, according to some embodiments herein.

FIG. 9 is a block diagram that illustrates an overall view of a method for processing delivery items according to some embodiments herein. At step 902, delivery item bags are brought to a sorting facility inbound station. At step 904, the delivery item bags are moved to a starting area or a staging area where the delivery item bags are further connected to a facility. At step 906, the delivery item bags are moved to a feeding area using a trolley or a conveyor. At step 908, the delivery item bags are opened and delivery items are taken out. At 910, a size of the delivery item is checked whether the delivery item is larger than the size that will be handled by robots. In one embodiment, the size of the delivery item is calculated using a weight and volume scale. At step 912, the delivery item is fed to the robot, if the delivery item is right in the size. At step 914, the delivery item is moved to a different sorting area, if the delivery item is larger in the size. In one embodiment, the sorting area is a manual station. In one embodiment, the sorting area could be an automated station. At step 916, a barcode scanner scans a barcode on the delivery item, once it is fed on the robot. It is possible that the delivery item has no mapped bin or damaged barcode sticker. Hence, the barcode scanner checks whether the barcode is valid or not at the step 916. At step 918, the robot receives a sorting bin location if the barcode is valid. At step 920, the robot receives a rejection bin sorting point location if the barcode is not valid. At step 922, the robot moves to an assigned sorting bin while elevating a delivery system or a tilting plate vertically up to a height of a destination bin 208. At step 924, the robot shifts the delivery item in the destination bin 208 by tilting the delivery system. In one embodiment, the delivery item is transferred using a conveyor. At step 926, a bag closing indication is given to an operator, once a bag is full. At step 928, the operator presses a button near the bag to indicate a bin closure until the bag is replaced with an empty bag. At step 930, the operator removes and closes the bag that is filled and presses the button near the destination bin 208 to indicate it as open, once the empty bag is placed on the destination bin 208. At step 932, the bag that is filled, is taken to an outbound using a conveyor or a trolley.

FIG. 10 illustrates a software system that controls a sorting system or a robotic sorting system for warehouse management or manufacturing management according to some embodiments herein. The robotic sorting system includes (i) a client software 1002 that includes an Application Programming Interface (API) 1004 to receive a barcode data or any other relevant data to fulfill a sorting operation, (ii) barcode scanners, cameras and volumetric scanners 1006 (iii) an Equipment Control System (ECS) 1008 that controls various equipment's in the robotic sorting system like the barcode scanners, the cameras, and the volumetric scanners 1006, (iv) a monitor or a graphical user interface (GUI) 1010 to display a relevant information to client to control, monitor and operate the robotic sorting system, (v) an alarm management system 1012 that takes care of safety of the robotic sorting system and triggers alarms in dangerous situations like fire and accident, (vi). a robot control system 1014 does fleet management and controls the robotic sorting system, (vii) a database 1016 where all relevant information is stored and retrieved like logging and delivery item information, (viii) a robot 1018 which operates robot motors, sensors, communication, and battery management, and (ix) a charging station 1020 that is used to make sure charging is happening safely and monitor the battery health while charging. In some embodiments, the robot control system 1014 is responsible for constantly monitoring and optimizing robot fleet operations. The robotic sorting system for automatic delivery here presented has multiple advantages. The robotic sorting system is optimized to save area and total cost of operation at a same time enabling a huge amount of delivery items to be sorted into multiple categories automatically with minimal human intervention. A robot pathway is unhindered and manages pick up and sorting of the delivery items into vertically arranged number of destination bins. A bagging area is on other side of one or more rack layout areas to ensure safety and there are multiple crossing areas to allow efficient movements.

Here is some data depicting the delivery items handled per hour according to experiments conducted. The robot per square feet is only in a range of 0.008-0.02 to handle delivery items in a range of 5000 to 15000 per hour. A warehouse area required corresponding to the delivery items per hour, is in a range of 6000 to 12000 square feet. The energy consumption to manage the operation for the same is in a range of 1.7 to 3.0 watts. The warehouse area can be increased or decreased and accordingly a number of delivery items to be sorted per hour may change. There is 50-70% reduction in the warehouse area required to sort the same amount of the delivery items when compared with conventional robot based sortation systems. The number of delivery items handled per hour by a robot is at least 100% more due to an efficient arrangement of layout. The energy consumption is less, making the robotic sorting system cost effective and environment friendly.

| Delivery items Per Hour | No of Destination bins~~208~~ | Number of Robots | Area required (sq. feet) | Robotic system/sqfeet | Energy consumed per sort (Watts) |
|---|---|---|---|---|---|
| 5000 | 200 | 55-65 | 6000-7000 | 0.008-0.010 | 1.7-2.3 |
| 10000 | 400 | 135-145 | 9000-10500 | 0.013-0.016 | 1.9-2.7 |
| 15000 | 500 | 215-235 | 12000-14000 | 0.015-0.02 | 2.2-3.0 |

The system and method according to the embodiments herein are applicable for all material handling facilities may include, but are not limited to, logistics, order fulfillment facilities, warehouses, distribution centers, packaging facilities, shipping facilities, manufacturing facilities, or other facilities or combination of facilities for performing one or more functions of material handling.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope.

We claim:

1. A robotic sorting system for automatically sorting and delivering delivery items in a plurality of destination bins, wherein the robotic sorting system comprises:

at least one robot, wherein the at least one robot comprises (a) an inbuilt lifting unit; (b) a delivery system that is attached to the inbuilt lifting unit; (c) a control unit; and (d) a barcode scanner, wherein the delivery system comprises a tilting plate that receives a delivery item from a feeding unit in a sorting area and starts a sorting process, wherein the barcode scanner scans a barcode printed on the delivery item when the robotic sorting system is in operation, wherein the control unit comprises a processor that processes the scanned barcode to determine a destination bin from the plurality of destination bins for sorting the delivery item within the sorting area, wherein the sorting area comprises a plurality of feeder areas where the delivery item arrives for feeding to the at least one robot which waits for its turn to receive the delivery item and move to the destination bin;

a plurality of crossing areas which has a space for the passage of the at least one robot and includes an entry-exit door for one or more baggers and trolleys to pass the plurality of crossing areas;

a plurality of robot walking areas, where the at least one robot moves on the way to a sorting location of the destination bin;

a plurality of rack layout areas each comprising a plurality of racks, wherein each rack includes the plurality of destination bins that are arranged vertically on top of other destination bins with a plurality of vertical levels in each rack to allow efficient sorting and delivering of the delivery items; and a plurality of bagging areas that are coupled with a bagging side of the plurality of rack layout areas where the delivery items that are sorted are bagged for distribution, in order to reduce the transition time, congestion and bagging operation time, wherein the plurality of crossing areas enable the plurality of robot walking areas to decouple from the one or more baggers and a trolleys passage area connecting the plurality of bagging areas to enable an unhindered passage for the at least one robot;

and determines a destination path for the at least one robot to reach the destination bin for sorting the delivery item;

wherein, upon determining the destination path for the at least one robot, the robotic sorting system automatically sorts and delivers the delivery item in the destination bin by enabling the control unit to simultaneously (a) control the at least one robot to concurrently (i) move along the destination path longitudinally and laterally in the plurality of robot walking areas to reach the destination bin, and (ii) lift the delivery item vertically up to a height to a vertical level of the destination bin by (A) controlling the inbuilt lifting unit, (B) lifting the tilting plate of the delivery system when the at least one robot is simultaneously moving towards the destination bin in the destination path longitudinally and laterally and (C) rotating the titling plate to deliver the delivery item to the destination bin, thereby reducing operation time of the at least one robot, wherein the robotic sorting system comprises a robot control system that constantly monitors and optimizes fleet operations of the at least one robot by enabling the plurality of delivery items to be sorted into the plurality of destination bins automatically, thereby saving area and operation cost;

(b) determine an alternative path for the at least one robot using an obstacle avoidance system to enable the at least one robot to reach the destination bin for delivering the delivery item at the destination bin if an obstacle is detected in the destination path of the at least one robot using an obstacle detection sensor of the at least one robot.

2. The robotic sorting system as claimed in claim 1, wherein the robotic sorting system comprises at least one of a camera, the barcode scanner, and a volumetric scanner, that identifies the delivery item for determining the destination bin for the at least one robot and captures the volumetric dimensions of the delivery item.

3. The robotic sorting system as claimed in claim 1, wherein the at least one robot comprises at least one of a floor barcode scanning unit, a camera or a light detection and ranging (LIDAR) sensor that identifies a location of the at least one robot in the sorting area and sends location information associated with the least one robot to the control unit to localize the least one robot for reaching the destination bin.

4. The robotic sorting system as claimed in claim 1, wherein the control unit is configured to determine a destination path for the least one robot to reach a charging station for charging based on a battery state of the least one robot.

5. The robotic sorting system as claimed in claim 1, wherein the inbuilt lifting unit comprises a telescopic lifting unit or a scissor lifting unit or a hydraulic lifting unit or a pneumatic lifting unit.

6. The robotic sorting system as claimed in claim 1, wherein the robot control system performs fleet management of fleet of the at least one robot and controls the robotic sorting system, and wherein the robotic sorting system comprises a database that stores at least one of logging information or delivery item information.

7. The robotic sorting system as claimed in claim 1, wherein the plurality of bagging areas are decoupled from the at least one robot, for ensuring safety, by vertically differentiating the plurality of robot walking areas from the plurality of bagging areas at the plurality of crossing areas.

8. The robotic sorting system as claimed in claim 1, wherein the plurality of rack layout areas comprises a sorting side that is coupled with the plurality of robot walking areas and a bagging side that is coupled with the plurality of bagging areas.

9. The robotic sorting system as claimed in claim 1, wherein the delivery system comprises one or more of a conveyor, a push system, a sliding system, a passive delivery system or a tilted mechanism, on which the delivery item is placed to transfer the delivery item to the destination bin.

10. The robotic sorting system as claimed in claim 1, further comprising an equipment control system that controls one or more equipments in the robotic sorting system, wherein the one or more equipments comprise at least one of the feeding unit, a camera, the barcode scanner, or a volumetric scanner.

11. The robotic sorting system as claimed in claim 1, further comprising a robot body on top of which the inbuilt lifting unit is positioned.

12. The robotic sorting system as claimed in claim 11, wherein the robot body comprises a drive system that enables movement of the at least one robot to reach the destination bin according to the destination path.

13. A method for automatically sorting a delivery item in a plurality of destination bins using a robotic sorting system, wherein the robotic sorting system comprises at least one robot, the method comprising:

receiving a delivery item on a tilting plate of a delivery system of the at least one robot from a feeding unit in a sorting area and starting a sorting process;

scanning, using a barcode scanner, a barcode printed on the delivery item;

processing the scanned barcode to determine a destination bin from the plurality of destination bins for sorting the delivery item within the sorting area, wherein the sorting area comprises a plurality of feeder areas where the delivery item arrives for feeding to the at least one robot which waits for its turn to receive the delivery item and move to the destination bin;

a plurality of crossing areas which has a space for the passage of the at least one robot and includes an entry-exit door for one or more baggers and trolleys to pass the plurality of crossing areas;

a plurality of robot walking areas, where the at least one robot moves on the way to a sorting location of the destination bin;

a plurality of rack layout areas each comprising a plurality of racks, wherein each rack includes the plurality of destination bins that are arranged vertically on top of other destination bins with a plurality of vertical levels in each rack to allow efficient sorting and delivering of the delivery items; and a plurality of bagging areas that are coupled with a bagging side of the plurality of rack layout areas where the delivery items that are sorted are bagged for distribution, in order to reduce the transition time, congestion and bagging operation time, wherein the plurality of crossing areas enable the plurality of robot walking areas to decouple from the one or more baggers and a trolleys passage area connecting the plurality of bagging areas to enable an unhindered passage for the at least one robot;

automatically determining a destination path for the at least one robot to reach the destination bin in the sorting area;

upon determining the destination path for the at least one robot, automatically sorting and delivering the delivery item in the destination bin by enabling a control unit to simultaneously (a) control the at least one robot to concurrently (i) move along the destination path longitudinally and laterally in the plurality of robot walking areas to reach the destination bin, and (ii) lift the delivery item vertically up to a height to a vertical level of the destination bin by (A) controlling the inbuilt lifting unit, (B) lifting the tilting plate of the delivery system when the at least one robot is simultaneously moving towards the destination bin in the destination path longitudinally and laterally and (C) rotating the titling plate to deliver the delivery item to the destination bin, thereby reducing operation time of the at least one robot, wherein the robotic sorting system comprises a robot control system that constantly monitors and optimizes fleet operations of the at least one robot by enabling the plurality of delivery items to be sorted into the plurality of destination bins automatically, thereby saving area and operation cost;

(b) determine an alternative path for the at least one robot using an obstacle avoidance system to enable the at least one robot to reach the destination bin for delivering the delivery item at the destination bin if an obstacle is detected in the destination path of the at least one robot using an obstacle detection sensor of the at least one robot.

14. The method as claimed in claim 13, wherein the method comprises identifying a location of the least one robot in the sorting area and localizing the least one robot for reaching the destination bin based on the location information associated with the least one robot.

* * * * *